M. CHEIFETZ.
LATITUDE INSTRUMENT.
APPLICATION FILED NOV. 22, 1911.
1,034,767.
Patented Aug. 6, 1912.
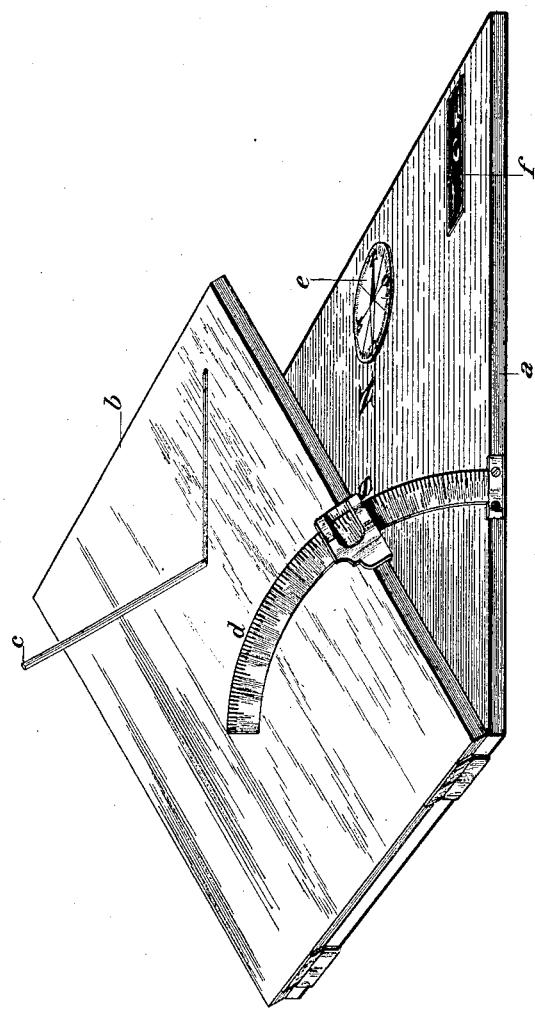
WITNESSES:
INVENTOR:
Morduch Cheifetz

UNITED STATES PATENT OFFICE.

MORDUCH CHEIFETZ, OF MOZYR, RUSSIA, ASSIGNOR OF ONE-HALF TO JANKEL-ARON CHEIMOWITSCH RABINOWITSCH, OF WILNA, RUSSIA.

LATITUDE INSTRUMENT.

1,034,767. Specification of Letters Patent. Patented Aug. 6, 1912.

Application filed November 22, 1911. Serial No. 661,843.

*To all whom it may concern:*

Be it known that I, MORDUCH CHEIFETZ, merchant, a subject of the Emperor of Russia, residing at the city of Mozyr, in the Government of Minsk, in the Russian Empire, have invented certain new and useful Improvements in Latitude Instruments, of which the following is a specification.

The exact determination of the geographical latitude of a given place is of the greatest importance both for the sailor and the aeronaut.

The present invention relates to improvements in latitude instruments whereby any one may determine the geographical latitude of a place, in which he is, at the respective moment.

The present apparatus is based upon the principle, of measuring the angular degree of the shadow of the sun and the moon respectively. It is a generally known fact, that in the Northern Hemisphere, the sun at noon is seen in the southern sky, and for that reason, shadows cast by objects, at that time, in the Northern Hemisphere will fall to the north. In the Southern Hemisphere, it will be understood that exactly the reverse conditions prevail as the sun is seen in the northern sky. This constancy of phenomena is true, only of the area beyond the tropics as in the tropical countries shadows at noon will sometimes on the same latitude point northward and at other times will point southward depending on the position of the sun to the respective latitude. In tropical countries another phenomenon is observed, namely that on two days of the year there exists for each latitude no shadow whatever at noon. This phenomenon appears on one day during each half of the year, namely when the place of observation passes below the sun, and beneath its central ray. At noon this central ray then falls vertically on the meridian, and all objects throw no shadow. Thus on every day in the year there is some point in the Tropical Zone, where there exists no shadow at noon. That point being, where the latitude passes vertically beneath the sun.

The present invention now refers to an apparatus by means of which the geographical latitude of any place may be determined.

In the operation of my device a rod is brought at noon, or at the moment when the moon passes the meridian, to such a position toward the sun or the moon respectively, that its shadow is reduced to 0. In carrying out the measuring operation, the rod is secured at right angles to a level surface, said surface adapted to be moved around a horizontal axis. This surface is then either at noon, or at night when the moon passes through the meridian, turned so far around the said horizontal axis that the shadow thrown by the rod on to the thereto rigidly connected surface, is reduced to 0. The angle, which the thus adjusted surface then forms with the horizon, is measured in degrees, thus determining the distance expressed in degrees of the respective place of observation from the parallel under the sun or the moon respectively.

The accompanying drawing illustrates an apparatus adapted to determine the geographical latitude of a given place.

It consists of a bottom horizontal plate or disk *a*, made of wood, metal glass or the like, and an upper plate or disk *b* hinged to the former, on which a pin *c* is secured at right angles. The upper plate may be inclined at any angle to the bottom plate or disk, and such inclination measured, by means of a quadrant *d* provided with graduations and a vernier arrangement secured to the lower plate; on the latter I mount also a compass *e*, and a spirit level *f*, for adjusting the apparatus.

In the operation of my device the lower plate is leveled exactly into a horizontal position, whereupon the line thereon marked N—S, should be directed by means of the magnet needle, in a line running from north to south. The upper plate is then adjusted with relation to the lower one, so that the graduation on the quadrant points at zero, and the pin *c* is in a vertical position relative to the horizontal line running from north to south. At noon, when the shadow of the said pin (on the Northern Hemisphere) points toward north (or on the Southern Hemisphere toward south) the upper plate is raised toward the sun and inclined so far, that the pin throws no shadow. The number of degrees read on the quadrant, indicates the number of degrees the respective place of observation, is distant from the parallel which for the moment lies beneath the sun. If now the deviation of the sun from the Equator for the given day is taken into consideration, which is determined for all days of the year in astronomical calendars, the geographical latitude of the respective place may be ascertained according to the following formula: On the Northern Hemisphere the degrees of the northern deviation are added to the degrees of the angle of inclination of the plate, whereas they are deducted on the Southern Hemisphere; the degrees of the southern deviation are deducted on the Northern Hemisphere and added on the Southern Hemisphere. The sum total of this calculation is the degree of latitude of the respective place.

The geographical latitude of the respective place can also be ascertained by means of the shadow of the moon, the apparatus being adjusted in the hereinbefore described manner, during the passage of the moon through the meridian of the respective place.

Having thus described my invention, what I claim and desire to secure by Letters Patent of the United States is:

A latitude instrument comprising, a base plate having a compass and level, an upper plate hinged to said base plate, said upper plate having a post mounted thereon at right angles thereto and a graduated quadrant fitted with a vernier attachment adapted to measure the angle of said plates when the said post is parallel to the rays of the sun or moon thereby determining the latitude.

In testimony whereof I have affixed my signature in presence of two witnesses.

MORDUCH CHEIFETZ.

Witnesses:
HERMANN SCHLOSS,
HENRY HASPER.